US011306799B2

(12) United States Patent
Zhao et al.

(10) Patent No.: US 11,306,799 B2
(45) Date of Patent: Apr. 19, 2022

(54) INNER ROLLER FEEDING DEVICE FOR A BASEPLATE OF COUNTER-ROLLER DRIVING POWER SPINNING EQUIPMENT

(71) Applicant: Xi'an Jiaotong University, Xi'an (CN)

(72) Inventors: Shengdun Zhao, Xi'an (CN); Fan Li, Xi'an (CN); Chengcheng Zhu, Xi'an (CN); Shuqin Fan, Xi'an (CN); Hong Jiang, Xi'an (CN)

(73) Assignee: Xi'an Jiaotong University, Xi'an (CN)

( * ) Notice: Subject to any disclaimer, the term of this patent is extended or adjusted under 35 U.S.C. 154(b) by 153 days.

(21) Appl. No.: 16/929,134

(22) Filed: Jul. 15, 2020

(65) Prior Publication Data
US 2021/0025476 A1    Jan. 28, 2021

(30) Foreign Application Priority Data

Jul. 22, 2019   (CN) .......................... 201910661704.6

(51) Int. Cl.
*F16H 1/16*         (2006.01)
*F16H 55/02*        (2006.01)

(52) U.S. Cl.
CPC ............. *F16H 1/166* (2013.01); *F16H 55/02* (2013.01)

(58) Field of Classification Search
CPC ....... F16H 1/166; F16H 55/02; B21D 41/026; B21D 41/02
See application file for complete search history.

(56) References Cited

U.S. PATENT DOCUMENTS

| 1,469,565 | A | * | 10/1923 | Mauck | ................... B21D 41/02 72/117 |
| 2,882,851 | A | * | 4/1959 | Graves | ................... B21D 41/04 72/85 |
| 3,874,208 | A | | 4/1975 | Werner | |
| 2018/0087334 | A1 | * | 3/2018 | Bouligny | .............. E21B 19/164 |
| 2021/0023602 | A1 | * | 1/2021 | Zhao | ...................... B21D 22/16 |

FOREIGN PATENT DOCUMENTS

| CN | 101147937 A | 3/2008 |
| CN | 104668329 A | 6/2015 |
| CN | 205110485 U | 3/2016 |
| JP | S63183730 A | 7/1988 |

* cited by examiner

*Primary Examiner* — Terence Boes
(74) *Attorney, Agent, or Firm* — Bayramoglu Law Offices LLC

(57) ABSTRACT

An inner roller feeding device for a baseplate of a counter-roller driving power spinning equipment includes an inner roller column, an inner roller top plate, an inner roller upper plate, an inner roller lower plate, a cam, a cam mounting cylinder, inner rollers, inner roller shafts, a feed screw, a servo motor and a baseplate. According to the inner roller feeding device, a brake motor serves as a power source, the inner roller is driven by the cam through a worm gear drive to feed along a radial direction of a workpiece, such that an inner roller mechanism is small in size, large in adjustment range and high in positioning precision.

5 Claims, 4 Drawing Sheets

INNER ROLLER FEEDING DEVICE FOR A BASEPLATE OF COUNTER-ROLLER DRIVING POWER SPINNING EQUIPMENT

CROSS REFERENCES TO THE RELATED APPLICATIONS

This application is based upon and claims priority to Chinese Patent Application No. 201910661704.6, filed on Jul. 22, 2019, the entire contents of which are incorporated herein by reference.

TECHNICAL FIELD

The present disclosure relates to the technical field of spinning processing, and in particular relates to an inner roller feeding device for a baseplate of counter-roller driving power spinning equipment.

BACKGROUND

Counter-roller power spinning is developed on the basis of mandrel spinning technology. Inner and outer surfaces of a cylinder blank are processed simultaneously by an inner roller instead of a mandrel.

Counter-roller spinning is to process inner and outer sides of a workpiece simultaneously by a pair or a plurality of pairs of inner and outer rollers. Compared with the traditional spinning method, counter-roller spinning is to replace the mandrel by the inner roller, thus improving the flexibility of the process, reducing the cost of a spinning die, improving the inner surface quality of a spinning part, overcoming the defect that inner and outer surfaces of the traditional spinning part are different in deformation, and obviously enhancing the quality of the workpiece. According to counter-roller spinning, the position of the spinning wheel may be adjusted according to the size requirement of the workpiece, thereby achieving flexible processing of cylindrical parts with different diameters and different wall thicknesses. The process is suitable for manufacturing of large-size and thin-walled cylinders in the fields of aerospace and military industry. It has been concerned by the major industrial powers in Europe and the United States as soon as it came out. Due to application of counter-roller spinning only limited to the high-tech fields of aerospace, or the like, and huge research and development difficulty in the process and the equipment, only the United States and Germany has deeply researched and applied the counter-roller spinning at present to supply products for NASA (National Aeronautics and Space Administration) and ESA (European Space Agency).

At present, engineering application of large-size baseplate of counter-roller power spinning device has not yet been reported in China, and only scientific research institutions such as colleges and universities, research institutions, or the like have carried out related theoretical research and experimental simulation. Professor Xia Qin-xiang, et al. from South China University of Technology have developed a small horizontal three-counter spinning experimental structure by using the positioning chuck of Archimedes' rotating disk mechanism and have carried out experimental research on the machine tool. According to the structure, the inner roller uses the method of pulling the wedge by the lead screw to adjust the position. The position adjustment range of the inner roller is limited and the flexibility is poor, and the inner roller frame and the inner roller shaft are cantilever structures with poor rigidity. Xu Wen-chen, et al. from Harbin Institute of Technology have invented an inner roller feeding device for the baseplate of a large-scale thin-walled cylinder spinning equipment. The equipment also uses a feed screw to drive a conical wedge to adjust the radial feed of the inner roller. The adjustment range of the radial position of the inner roller is limited, the flexibility is poor, and the inner roller frame is a cantilever structure with insufficient rigidity.

SUMMARY

The invention provides an inner roller feeding device for the baseplate of counter-roller driving power spinning equipment, which solves the problems of the existing baseplate of the mandrel spinning device, such as high cost of the mandrel, poor universality and long manufacturing cycle, thus breaking through the limitation of the small adjustment range of the inner spinning feeding device of the current counter-roller spinning technology, and improving the rigidity of the inner roller feeding device.

The technical solution of the invention to solve the above problems is: an inner roller feeding device for the baseplate of counter-roller driving power spinning equipment, which specifically includes:

an inner roller column, an inner roller top plate, an inner roller upper plate, an inner roller lower plate, a cam, a cam mounting cylinder, an inner roller, inner roller shafts, a feeding screw, a servo motor and a baseplate;

a plurality of inner roller columns are vertical to the baseplate, one end of each inner roller column is fixed on the baseplate and the other end of each inner roller column is fixedly connected to the inner roller top plate, and a middle section of each inner roller column is respectively connected to the inner roller upper plate and the inner roller lower plate through a guide sleeve;

a plurality of inner roller shafts are arranged between the inner roller upper plate and the inner roller lower plate, the inner roller is mounted on the inner roller shaft, the inner roller upper plate and the inner roller lower plate are provided with a U-shaped groove, the inner roller shaft may slide in the U-shaped grooves of the inner roller upper plate and the inner roller lower plate, a plurality of double-end studs are mounted at two ends of the inner roller upper plate and the inner roller lower plate for preventing the inner roller upper plate and the inner roller lower plate from moving, the cam mounting cylinder is mounted between the inner roller upper plate and the inner roller lower plate, a bottom of the cam mounting cylinder is inserted on the inner roller lower plate and the cam mounting cylinder may rotate around its own axis, an upper part of the cam mounting cylinder passes through the inner roller upper plate and is fixedly connected to a worm wheel, two cams are respectively fixedly mounted at positions, proximal to the inner roller upper plate and the inner roller lower plate, of the cam mounting cylinder, convex sides of the cams are tangent to the inner roller shafts, two same worm seats are mounted on the inner roller upper plate, the two worm seats are respectively connected to two ends of a worm, a synchronous belt wheel is mounted at one end of the worm and is connected to a belt wheel at a shaft end of a brake motor through a synchronous belt, the worm is engaged with the worm wheel, the worm wheel is fixedly mounted on the cam mounting cylinder by a flat key;

the inner roller lower plate is connected to the feed screw by a screw nut, and a bottom of the feed screw is fixed on the baseplate and is connected to the servo motor.

Further, a backup plate is mounted on an end part of each U-shaped groove of the inner roller upper plate and the inner roller lower plate, thereby preventing the inner roller shafts from sliding out of the U-shaped grooves.

Further, the number of the inner roller columns is three.
Further, the number of the inner roller shafts is three.
Further, the number of the double-end studs is three.

Advantages of the Invention (1) According to the present disclosure, a brake motor serves as a power source, the inner roller is driven by the cam through a worm gear drive to feed along a radial direction of a workpiece, such that an inner roller mechanism is small in size, large in adjustment range and high in positioning precision.

(2) The feeding mechanism of the inner roller is connected to the column, and the bottom of the inner roller column is fixedly connected with the baseplate of the spinning device, and the top plate of the inner roller is connected with the upper beam of the spinning device through the cover plate, thus improving the stress state of the inner roller mechanism and avoiding the disadvantage of poor rigidity of the cantilever structure.

Figure 1:
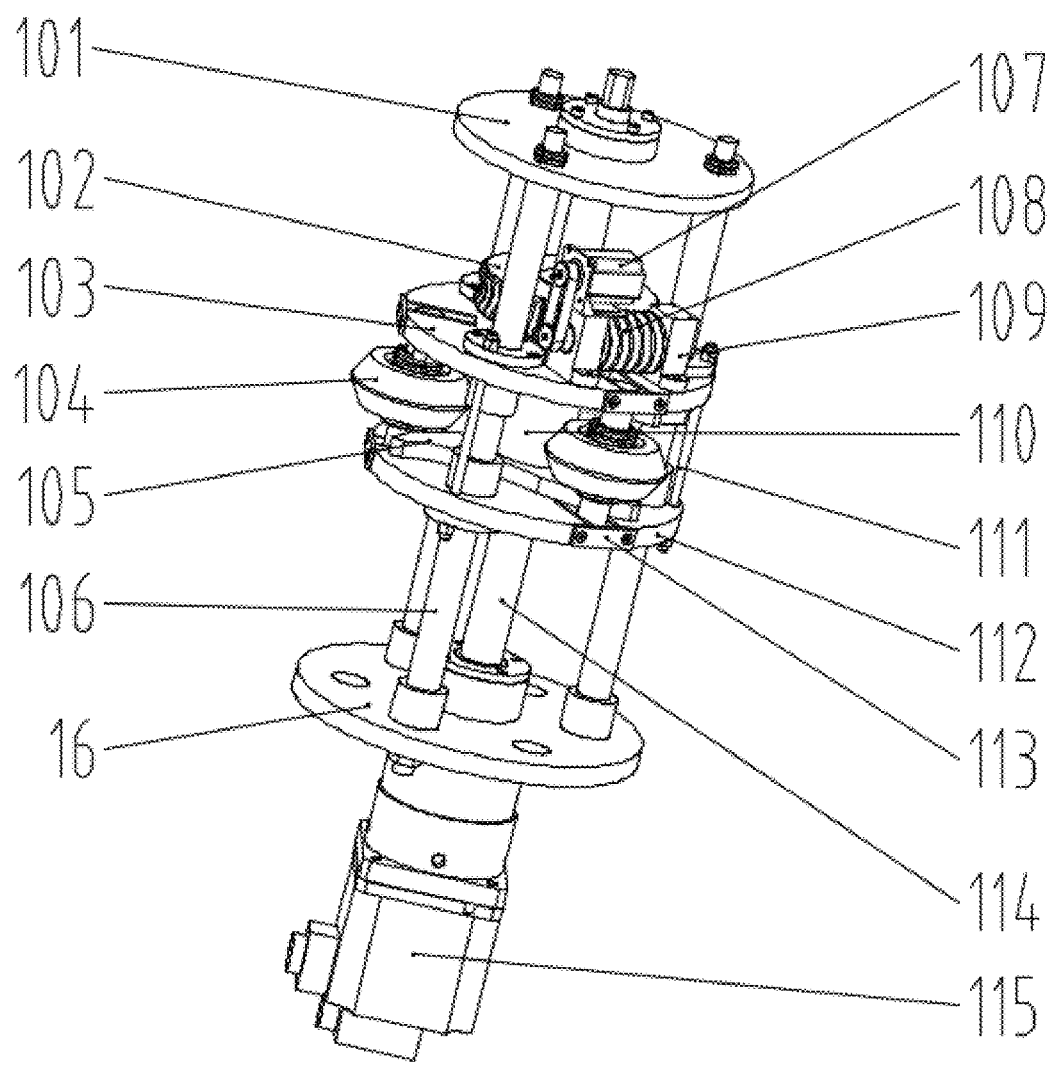
FIG. 1 is a structural schematic diagram of an inner roller feeding device for a baseplate of counter-roller driving power spinning equipment according to the invention.
Figure 2:
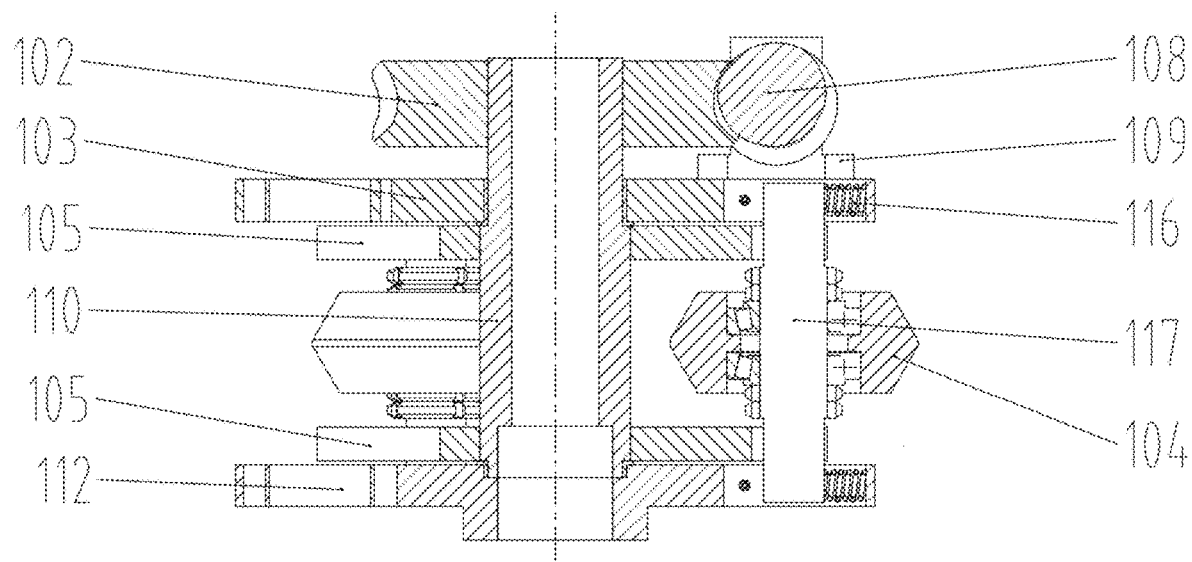
FIG. 2 is a structural sectional view of a structural roller frame of an inner roller feeding device for a baseplate of counter-roller driving power spinning equipment according to the invention.
Figure 3:
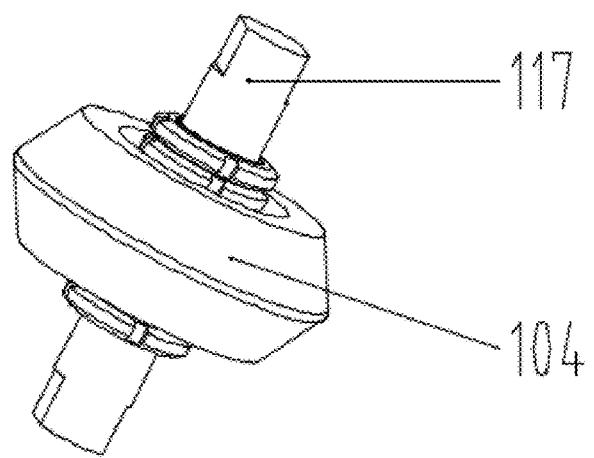
FIG. 3 is a structural schematic diagram of an inner roller according to the invention.

In the drawings: 101—inner roller top plate; 102—worm wheel; 103—inner roller upper plate; 104—inner roller; 105—cam; 106—inner roller column; 107—brake motor; 108—worm; 109—worm seat; 110—cam mounting cylinder; 111—double-end stud; 112—inner roller lower plate; 113—back up plate; 114—feed screw; 115—servo motor; 116—return spring; 117—inner roller shaft; 16—spinning equipment baseplate.

DETAILED DESCRIPTION OF THE EMBODIMENTS

In order to make objectives, technical solutions, and advantages of embodiments of the present invention clearer, the technical solutions in the embodiments of the present invention are described clearly and completely in the following with reference to accompanying drawings in the embodiments of the present invention. Apparently, the described embodiments are only part rather than all of the embodiments of the present invention. All other embodiments obtained by persons of ordinary skill in the art based on the embodiments of the present invention without creative efforts shall fall within the protection scope of the present invention. Therefore, the detailed descriptions about the embodiments of the present invention in the accompanying drawings are not intended to limit the protection scope, and are merely selected embodiments of the invention. All other embodiments obtained by persons of ordinary skill in the art based on the embodiments of the present invention without creative efforts shall fall within the protection scope of the present invention.

Referring to FIGS. 1-7, disclosed is an inner roller feeding device for a baseplate of counter-roller driving power spinning equipment, including: an inner roller column 106, an inner roller top plate 101, an inner roller upper plate 103, an inner roller lower plate 112, a cam 105, a cam mounting cylinder 110, an inner roller 104, an inner roller shaft 117, a feed screw 114, a servo motor 115 and a spinning equipment baseplate 16.

A plurality of inner roller columns 106 are vertical to the spinning equipment baseplate 16, one end of each inner roller column 106 is fixed on the spinning equipment baseplate 16 and the other end of each inner roller column 106 is fixedly connected to the inner roller top plate 101, and a middle section of each the inner roller column 106 is respectively connected to the inner roller upper plate 103 and the inner roller lower plate 112 through a guide sleeve.

A plurality of inner roller shafts 117 are arranged between the inner roller upper plate 103 and the inner roller lower plate 112, the inner roller 104 is mounted on the inner roller shaft 117, both the inner roller upper plate 103 and the inner roller lower plate 112 are provided with a U-shaped groove, the inner roller shaft 117 may slide in the U-shaped grooves of the inner roller upper plate 103 and the inner roller lower plate 112, a plurality of same double-end studs 111 are mounted at two ends of the inner roller upper plate 103 and the inner roller lower plate 112 for preventing the inner roller upper plate 103 and the inner roller lower plate 112 from moving, a cam mounting cylinder 110 is mounted between the inner roller upper plate 103 and the lower plate, a bottom of the cam mounting cylinder 110 is inserted on the inner roller lower plate 112 and the cam mounting cylinder 110 may rotate around its own axis, an upper part of the cam mounting cylinder 110 passes through the inner roller upper plate 103 and is connected to a worm wheel through a flat key, two cams 105 are respectively mounted at positions, proximal to the inner roller upper plate 103 and the inner roller lower plate 112, of the cam mounting cylinder 110 through a flat key connection, convex sides of the cams 105 are tangent to the inner roller shafts 117, two same worm seats 109 are mounted on the inner roller upper plate 103, the two worm seats 109 are respectively connected to two ends of a worm 108, a synchronous belt wheel is mounted at one end of the worm 108 and is connected to a belt wheel at a shaft end of a brake motor 107 through a synchronous belt, the worm 108 is engaged with the worm wheel, the worm wheel is fixedly mounted on the cam mounting cylinder 110 by a flat key.

The inner roller lower plate 112 is connected to the feed screw 114 by a screw nut, and a bottom of the feed screw 114 is fixed on the spinning equipment baseplate 16 and is connected to the servo motor 115.

Figure 4:
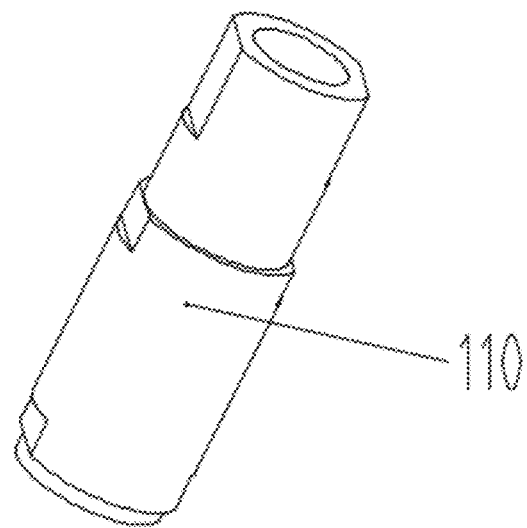
FIG. 4 is a structural diagram of a cam mounting cylinder according to the invention.
Figure 5:
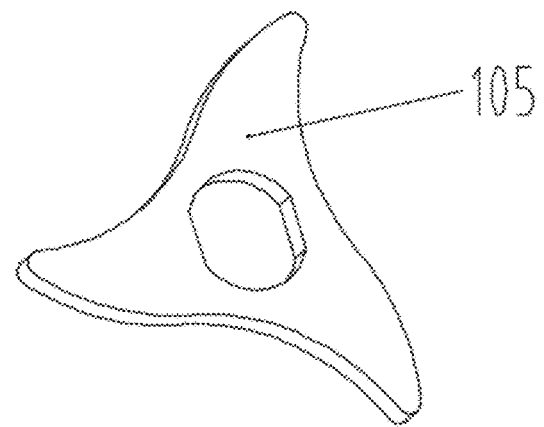
FIG. 5 is a structural schematic diagram of a cam according to the invention.
Figure 6:
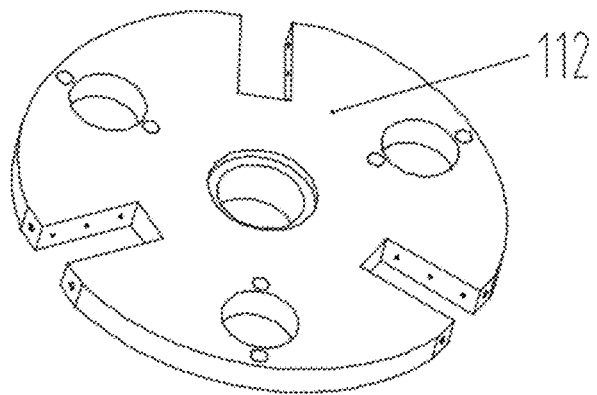
FIG. 6 is a structural schematic diagram of an inner roller lower plate according to the invention.

Referring to FIG. 4, two right angle bosses are cut out at the shaft end of the inner roller shaft 110. The boss plane of the inner roller shaft 110 contacts with the U-shaped groove, and the shoulder plane is respectively pushed on the inner roller upper plate 103 and the inner roller lower plate 112 to ensure that the inner roller shaft 110 is always perpendicular to the inner roller upper plate 103 and the inner roller lower plate 112.

Preferably, a backup plate 113 is mounted on an end part of each U-shaped groove of the inner roller upper plate 103 and the inner roller lower plate 112, thereby preventing the inner roller shafts 117 from sliding out of the U-shaped grooves.

Preferably, the number of the inner roller columns 106 is three. The three inner roller columns 106 are uniformly distributed on the circumference of the inner roller lower plate 112.

Preferably, the number of the inner roller shafts 117 is three. The three inner roller shafts 117 are uniformly distributed around the center of the axis of the cam mounting cylinder 110.

Preferably, the number of the double-end studs 111 is three. The three double-end studs 111 are uniformly distributed on the circumference of the inner roller lower plate 112.

Figure 7:
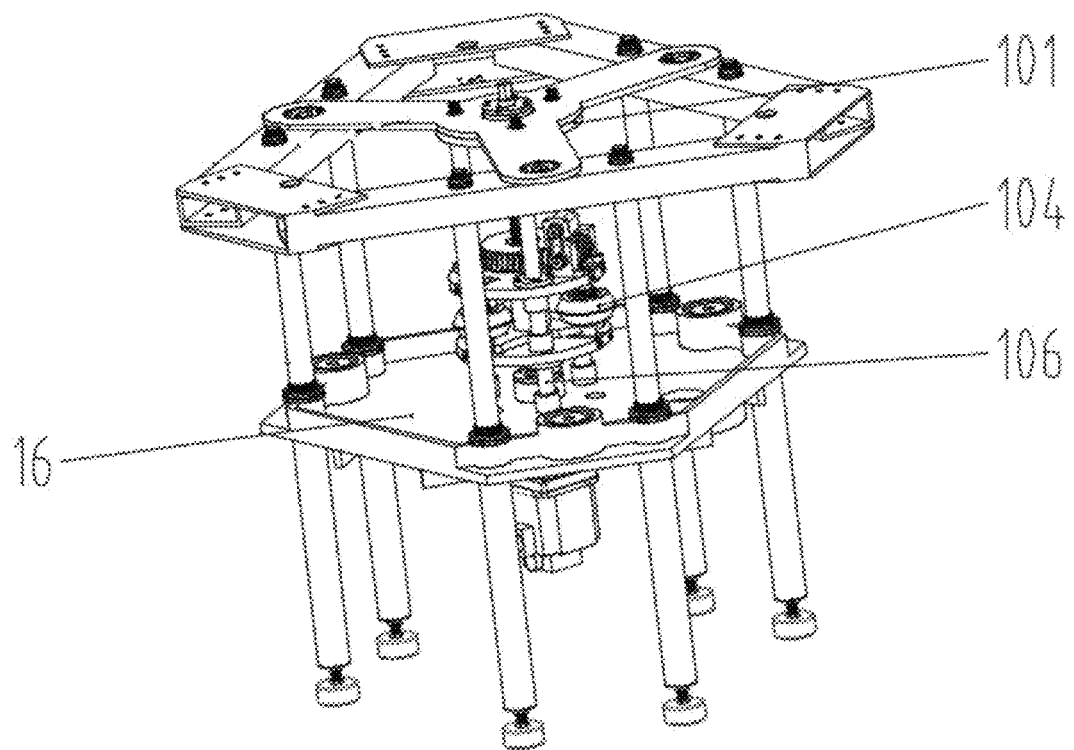
FIG. 7 is an assembly diagram of the invention on the spinning equipment.

Referring to FIG. 7, the feeding mechanism of the inner roller is connected by the inner roller column 106, and the base part of the inner roller column 106 is fixedly connected with the baseplate 16 of the spinning equipment, and the inner roller top plate 101 is connected with the upper beam of the spinning equipment through the cover plate, thus improving the stress state of the inner roller mechanism and avoiding the disadvantage of poor rigidity of the cantilever structure.

Embodiment: when the inner roller 104 feeds along the radial direction of the workpiece, the brake motor 107 is used as the power source to drive the worm 108 to rotate through the synchronous belt wheel, and the worm 108 rotates so that the worm wheel 102 drives the cam mounting cylinder 110 to rotate, the cam mounting cylinder 110 drives the cam 105 to rotate around the axis, and the convex sides of the cam 105 is tangent to the inner roller shaft 117, such that the inner roller shaft 117 moves outward along the U-shaped grooves on the inner roller upper plate 103 and the inner roller lower plate 112 to realize a radial feed. At the same time, the self-locking function of the worm gear and the brake function of the brake motor are used to ensure that the inner roller can be accurately positioned for processing after it is radially fed to the designated position.

When the inner roller 104 returns, it first drives the cam 105 to return to the designated position through the reverse rotation of the brake motor 107, and then uses the return spring to apply thrust to the inner roller shaft 117 to make the inner roller 104 return to the designated position.

When the inner roller 104 feeds along the axial direction of the workpiece, the servo motor 115 drives the feed screw 114 to rotate after the speed change of the reducer, and then drives the inner roller frame to move along the axial direction of the workpiece through the screw nut.

The above descriptions are only for the embodiments of the invention, not to limit the scope of the invention. Any equivalent structure or equivalent process transformation made by using the contents of the description and the drawings of the invention, or directly or indirectly used in other related system fields, are similarly included in the protection scope of the invention.

What is claimed is:

1. An inner roller feeding device for a baseplate of a counter-roller driving power spinning equipment, comprising:
    a plurality of inner roller columns, an inner roller top plate, an inner roller upper plate, an inner roller lower plate, two cams, a cam mounting cylinder, an inner roller, a plurality of inner roller shafts, a feed screw, a servo motor and a spinning equipment baseplate;
    the plurality of inner roller columns are vertical to the spinning equipment baseplate, a first end of each inner roller column of the plurality of inner roller columns is fixed on the spinning equipment baseplate and a second end of the each inner roller column is fixedly connected to the inner roller top plate, and a middle section of the each inner roller column is respectively connected to the inner roller upper plate and the inner roller lower plate through a guide sleeve;
    the plurality of inner roller shafts are arranged between the inner roller upper plate and the inner roller lower plate, the inner roller is mounted on each inner roller shaft of the plurality of inner roller shafts, the inner roller upper plate and the inner roller lower plate are provided with a plurality of U-shaped grooves, the each inner roller shaft slides in the plurality of U-shaped grooves of the inner roller upper plate and the inner roller lower plate, a plurality of double-end studs are mounted at two ends of the inner roller upper plate and two ends of the inner roller lower plate for preventing the inner roller upper plate and the inner roller lower plate from moving, the cam mounting cylinder is mounted between the inner roller upper plate and the inner roller lower plate, a base of the cam mounting cylinder is inserted on the inner roller lower plate and the cam mounting cylinder rotates around an axis of the cam mounting cylinder, an upper part of the cam mounting cylinder passes through the inner roller upper plate and is fixedly connected to a worm wheel, the two cams are respectively fixedly mounted at positions, proximal to the inner roller upper plate and the inner roller lower plate, of the cam mounting cylinder, a plurality of convex sides of the two cams are tangent to the plurality of inner roller shafts, two same worm seats are mounted on the inner roller upper plate, the two same worm seats are respectively connected to two ends of a worm, a synchronous belt wheel is mounted at one end of the worm and is connected to a belt wheel at a shaft end of a brake motor through a synchronous belt, the worm is engaged with the worm wheel, the worm wheel is fixedly mounted on the cam mounting cylinder by a flat key;
    the inner roller lower plate is connected to the feed screw by a screw nut, and a bottom of the feed screw is fixed on the spinning equipment baseplate and is connected to the servo motor.

2. The inner roller feeding device for the baseplate of the counter-roller driving power spinning equipment according to claim 1, wherein a backup plate is mounted on an end part of each U-shaped groove of the plurality of U-shaped grooves of the inner roller upper plate and the inner roller lower plate, thereby preventing the plurality of inner roller shafts from sliding out of the plurality of U-shaped grooves.

3. The inner roller feeding device for the baseplate of the counter-roller driving power spinning equipment according to claim 2, wherein a number of the plurality of inner roller columns is three.

4. The inner roller feeding device for the baseplate of the counter-roller driving power spinning equipment according to claim 3, wherein a number of the plurality of inner roller shafts is three.

5. The inner roller feeding device for the baseplate of the counter-roller driving power spinning equipment according to claim 4, wherein a number of the plurality of double-end studs is three.

* * * * *